UNITED STATES PATENT OFFICE.

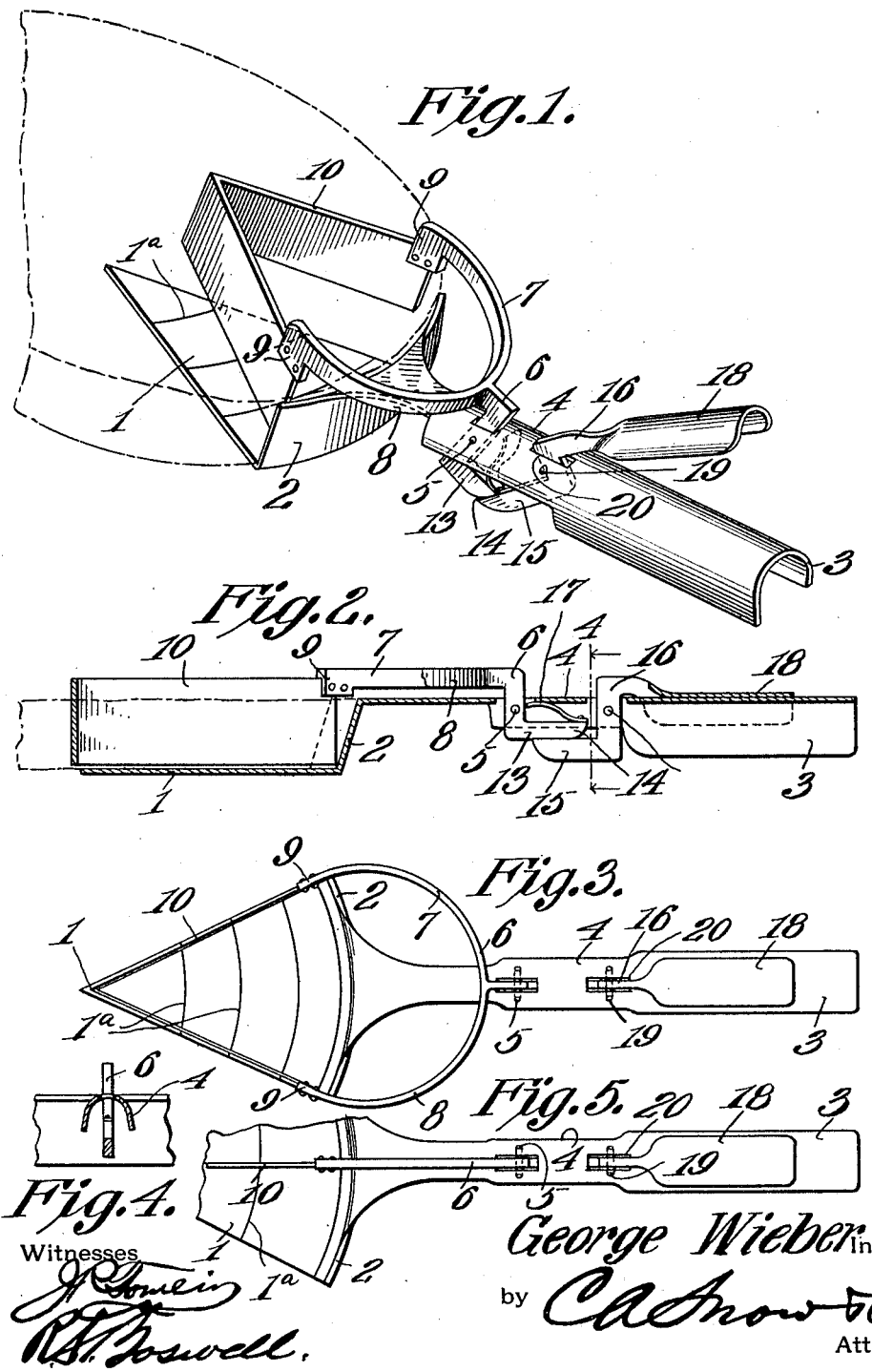

GEORGE WIEBER, OF SYRACUSE, NEW YORK.

CUTTER.

1,020,865.  Specification of Letters Patent.  Patented Mar. 19, 1912.

Application filed September 28, 1910. Serial No. 584,284.

*To all whom it may concern:*

Be it known that I, GEORGE WIEBER, a citizen of the United States, residing at Syracuse, in the county of Onondaga and State of New York, have invented a new and useful Cutter, of which the following is a specification.

This invention has relation to cutters especially adapted to be used for cutting cakes, pies and similar objects and consists in the novel construction and arrangement of its parts as hereinafter described and claimed.

The main object of the invention is to provide a device of this design including means, whereby the desired slice of pie or cake may be removed easily, without tearing or breaking the remainder of the cake or pie.

A further object of the invention is to provide a novel cutting device comprising two blades arranged triangularly with regard to one another. When cutting a piece of cake or pie the apex of the knife, when the knife is brought down upon the cake or pie, registers with the center thereof. The blade or member which is inserted below the cake or pie, and with which the knife coöperates, is also triangular in shape, the apex thereof being located approximately at the center of the cake, while a shoulder portion of the blade engages the outer circumferential edge of the cake or pie.

A further object of the invention is to provide a lever, pivotally mounted independent of the holder for the cutter, for engaging the holder, whereby the holder may be brought into an operative position. In the drawings, however, there is only disclosed one particular form of the invention, but in practical fields this form may require slight alterations, to which the applicant is entitled, provided the alterations are comprehended in the appended claim.

Other features and combinations of parts will hereinafter be set forth, shown in the drawings, and claimed.

In the drawings, Figure 1 is a perspective view of a cake, showing the application of the device. Fig. 2 is a sectional view through the cake and the device, showing the cutter buried in the cake. Fig. 3 is a top plan view of the entire device. Fig. 4 is a sectional view on line 4—4 of Fig. 2. Fig. 5 is a top plan view, showing a single knife employed, instead of the two, as shown in the other figures of the drawings.

As to the drawings, 1 denotes a plate, which may be of any desired shape or contour, but as shown in the drawings is made triangular. This plate is shaped to form the shoulder 2, and terminates into a handle 3. This handle 3 in cross section is semicircular, and the portion 4 thereof is of an inverted U-shaped construction, as shown in Fig. 4. Pivotally mounted upon the pin 5 (which is arranged transversely of the portion 4,) is the holder 6 for the knife. This holder 6 is provided with yokes 7 and 8, as shown in the top plan view of the drawings. The extremities of the yoke are bifurcated as indicated at 9, and are disposed as shown in the top plan view. Arranged in the bifurcations of these extremities are the cutting blades 10, which are arranged in a triangular shape. It will be noted from the drawings that the plate 1 is somewhat larger than the triangular shape of the disposition of the knives, so that the knives when they pass entirely through the cake, will engage the plate 1.

The rear portion of the holder 6 terminates into an extension 13, the lower rear end of which is curved as indicated at 14, so that the end 15 of the lever 16 may engage therewith frictionally, in order to throw the blades 10 downwardly toward the plate. When the lever 16 is operated to perform this function, the holder 6 is oscillated upon its pivot, against the action of the spring 17. This spring 17 is secured to the rear portion of the extension 13, and it co-acts with the under surface of the portion 4 of the said handle. This spring 17 tends to hold the holder and its knives in an upward position, as shown in Fig. 1. The handle 18 of the lever 16 is semicircular in cross section, in order to conform to the shape of the rear portion of the handle 3, whereby they may properly fit one another, when the knives and their holder are brought downwardly. The lever 16 is pivoted as at 19 in the portion 4 of the handle 3. In order to permit the holder 6 and the lever 16 to be pivoted to the portion 4, a slot 20 is provided. This slot 20 is elongated in form, in order to permit the proper operation of the various parts of the device. If it is so desired, the holder 6 may be constructed without the fork ends, and a single blade arranged in connection therewith, as shown in Fig. 5.

From the above description, it is evident that a novel and efficient utensil is produced, and one which operates readily, whereby a triangular shaped piece of cake or pie may be severed. It is also manifest that the various parts of the device may be made by a stamping process, there only necessitating two portions of the stamping machine, one for the stamping of the metal and the other for the shaping. The various parts may be made out of sheet metal or the like, with the exception of the blade, which may be made out of highly tempered steel. The plate 1 is provided with a plurality of lines 1ª whereby pies or cakes of various diameters may be held in registration with any one of the lines, in order to cut a segment thereof of the proper radius.

The invention having been set forth, what is claimed as new and useful is:

A cutter comprising a plate, a shoulder perpendicular thereto and extending throughout the width of the plate at one end, a handle connected to and extending rearwardly from the shoulder, said handle having spaced slots and being bowed transversely to constitute a housing, an angular cutting blade, a yoke fixedly connected thereto and extending over the shoulder, an extension upon the yoke and pivotally mounted within one of the slots, said extension having a projecting portion at its free end adapted to be housed in the handle, an operating lever pivotally mounted within the other slot, and having one end portion slidably engaging said projecting portion and adapted to be housed within the slotted handle, a handle upon the lever, and a spring partly housed within the slotted handle for holding the blade normally removed from the plate.

In testimony that I claim the foregoing as my own, I have hereto affixed my signature in the presence of two witnesses.

GEORGE WIEBER.

Witnesses:
EDWARD F. BYRNE,
JEREMIAH CAREY.

---

Copies of this patent may be obtained for five cents each, by addressing the "Commissioner of Patents, Washington, D. C."